US005469779A

United States Patent [19]
Amore et al.

[11] Patent Number: 5,469,779
[45] Date of Patent: Nov. 28, 1995

[54] AUTOMATIC PIZZA DOUGH PRESS DEVICE WITH INTERCHANGEABLE MOLDS

[75] Inventors: John A. Amore, Phillipsburg, N.J.;
Pasquale Balsamo, Allentown, Pa.

[73] Assignee: Balsamore Corp., Phillipsburg, N.J.

[21] Appl. No.: 319,438

[22] Filed: Oct. 6, 1994

Related U.S. Application Data

[63] Continuation-in-part of Ser. No. 207,084, Mar. 8, 1994, abandoned.

[51] Int. Cl.⁶ .............................. A47J 37/00; A47J 37/01; A47J 37/06
[52] U.S. Cl. .............................. 99/349; 99/353; 99/432; 100/93 P; 425/112; 425/394
[58] Field of Search .................. 99/349, 353–355, 99/426, 432, 372, 380, 422, 450.1, 483; 100/92, 93 R, 93 P; 425/136, 151, 160, 298, 324.1, 343, 293, 317, 394, 412, 383, 398; 426/496, 512

[56] References Cited

U.S. PATENT DOCUMENTS

| | | | |
|---|---|---|---|
| 1,880,858 | 10/1932 | Davis | 425/343 X |
| 1,995,515 | 3/1935 | Matassa | |
| 3,565,015 | 2/1971 | Jorgensen | 107/15 |
| 3,716,319 | 2/1973 | Norman | 425/394 |
| 3,785,278 | 1/1974 | Hopkins | 100/51 |
| 3,814,005 | 6/1974 | Widdel | 99/349 |
| 4,303,677 | 12/1981 | De Acetis | 426/27 |
| 4,559,002 | 12/1985 | Atwood | 425/394 X |
| 4,690,043 | 9/1987 | Pacilio | 99/353 |
| 4,905,581 | 3/1990 | Kirkpatrick | 99/353 |
| 4,973,240 | 11/1990 | Reilly | 425/195 |
| 5,074,778 | 12/1991 | Betts, Jr. et al. | 425/394 |
| 5,149,594 | 9/1992 | Lewandowski et al. | 426/496 |
| 5,154,115 | 10/1992 | Kian | 99/380 |
| 5,226,352 | 7/1993 | Savage | 99/439 |
| 5,303,643 | 4/1994 | Fisher et al. | 100/51 |

*Primary Examiner*—Timothy F. Simone
*Attorney, Agent, or Firm*—Kenneth P. Glynn

[57] ABSTRACT

The present invention is an automatic pizza dough press device for forming uncooked pizza pie from fresh dough. It includes a main housing frame; a base tray located within the frame and mounted therein to be at least partially slidable therefrom and is adapted for interchangeable and reversible bottom molds; an upper encasement on the frame; controls, a pump, motor and a hydraulic piston and cylinder connected to the upper encasement, the controls being at least two separate disparate controls and being connected to the motor, the motor and pump being hydraulically connected to the piston so as to move the piston downward and upward, and the piston being generally biased in an upward position; and, a top press mold connected to the piston for reciprocal movement therewith. The top press mold includes a heating unit to enhance dough relaxation without baking it. The controls are located sufficiently apart to necessitate a user to use two hands to operate the device.

20 Claims, 3 Drawing Sheets

AUTOMATIC PIZZA DOUGH PRESS DEVICE WITH INTERCHANGEABLE MOLDS

This is a Continuation-in-Part of application Ser. No. 08/207,084 filed Mar. 8, 1994, now abandoned.

BACKGROUND OF THE INVENTION

1. Field of the Invention

The present invention involves an automatic pizza dough device and, more specifically, one which relies upon a hydraulic piston for reciprocal movement of a top press mold using enhanced safety features. The device is faster, much more compact and less expensive than known devices.

2. Information Disclosure Statement

Pizza has been made from dough formed by hand for many decades. Attempts have been made to create commercially viable pizza machines. Such devices have included waffle type devices such as is shown in U.S. Pat. Nos. 1,995,515, 3,814,005 and 5,154,115. These devices tend to squeeze the dough forwardly from the hinge area and rely upon the weight of the device plus the strength of the user.

Pizza Systems, Inc. of Pataskala, Ohio offers hydraulic forming presses for pizza crust. These devices have complex springs, large housings and heavy base mechanisms.

Notwithstanding the above prior art, there is no known device which has been taught or suggested which includes a simple top press mold or platen, which is pre-heated and which includes separate dual controls for enhanced safety.

SUMMARY OF THE INVENTION

The present invention is an automatic pizza dough press device for forming uncooked pizza pie from fresh dough. It includes a main housing frame; a base tray located within the frame and mounted therein to be at least partially slidable therefrom and is adapted for interchangeable and reversible bottom molds; an upper encasement on the frame; controls, a pump, motor and a hydraulic piston and cylinder connected to the upper encasement, the controls being at least two separate disparate controls and being connected to the motor, the motor and pump being hydraulically connected to the piston so as to move the piston downward and upward, and the piston being generally biased in an upward position; and, a top press mold connected to the piston for reciprocal movement therewith. The top press mold includes a heating unit to enhance dough relaxation without baking it. The controls are located sufficiently apart to necessitate a user to use two hands to operate the device.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

The present invention pizza dough press device is for forming uncooked fresh pizza dough automatically. It varies significantly from typical automatic pizza dough press devices in that it does not rely upon hinged mechanisms, nor does it rely upon extremely heavy platen devices or molds, it has enhanced safety features with respect to controls and, uniquely, utilizes a heated upper platen, referred to herein as a "top press mold", so as to avoid dough sticking and to enhance the speed and success of the operation of the device itself. Further, due to the inclusion of a base tray which is mounted to be slidable therefrom, the present invention device has this feature to render operation easier, to allow the pizza dough to be removed from a mold while it is outside of the unit itself and to permit removable and therefore interchangeable molds of various sizes and even different shapes such as square and round. Thus, smaller pizzas such as a 10 inch pizza, standard pizzas such as 14 inch and 16 inch pizzas and extra large pizzas such as 18 inch pizzas can be produced as well as the well known square Sicilian pizzas can be produced by the present invention.

Figure 1:
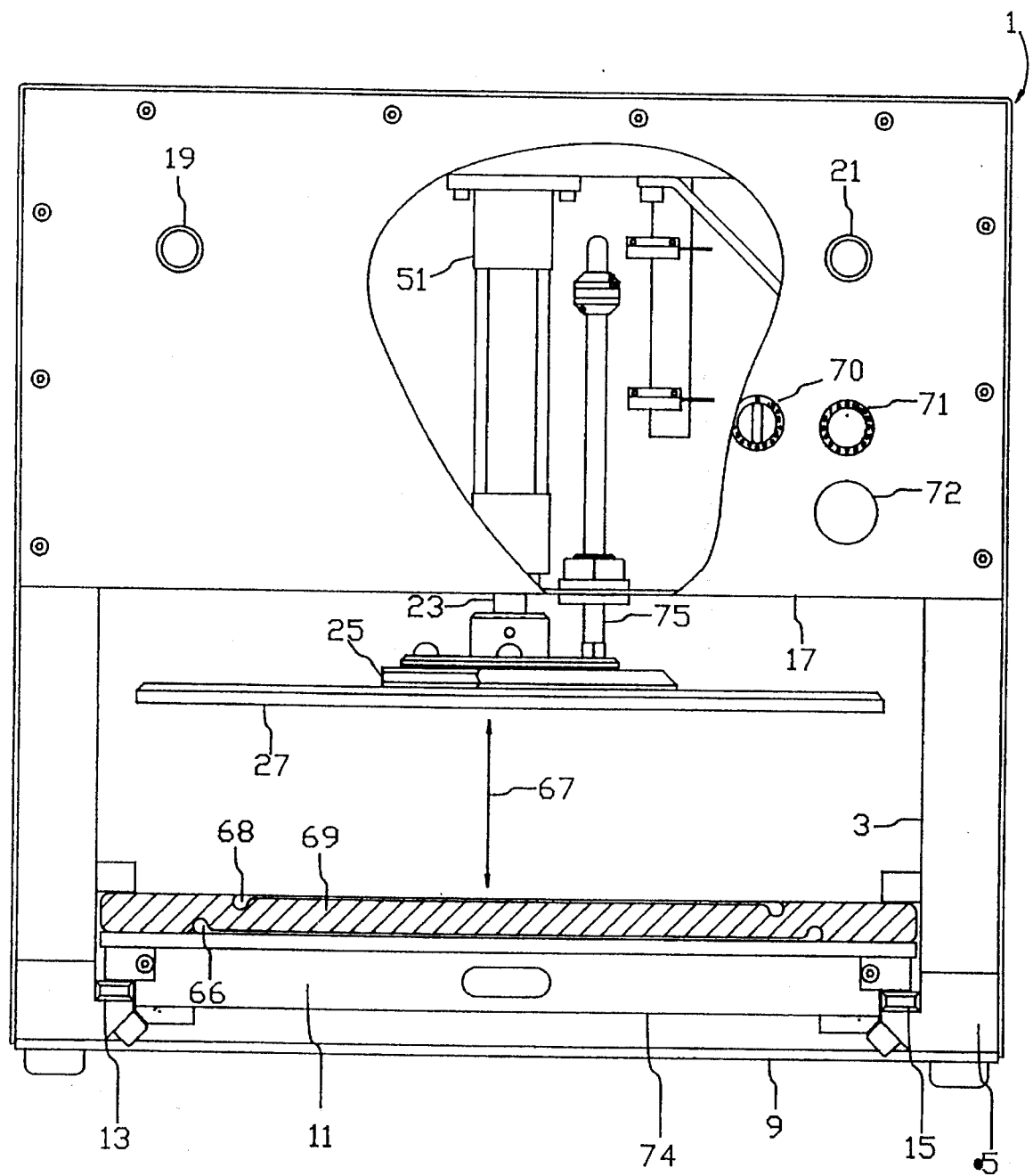
FIG. 1 shows a front, partially cut view of a present invention device.

Referring to FIG. 1, there is shown present invention automatic pizza dough press device 1 for forming uncooked pizza pie from fresh dough. It includes a main housing frame 3 which is made of sectional pieces and includes a bottom section 5 with a front rectangular base 9. There is a base tray 11 located within frame 3 and mounted so as to be at least partially removable therefrom, and, therefore, slidable therefrom. Thus, sliding drawer ways 13 and 15 are provided to permit tray 11 to extend outwardly from the unit.

Figure 2:
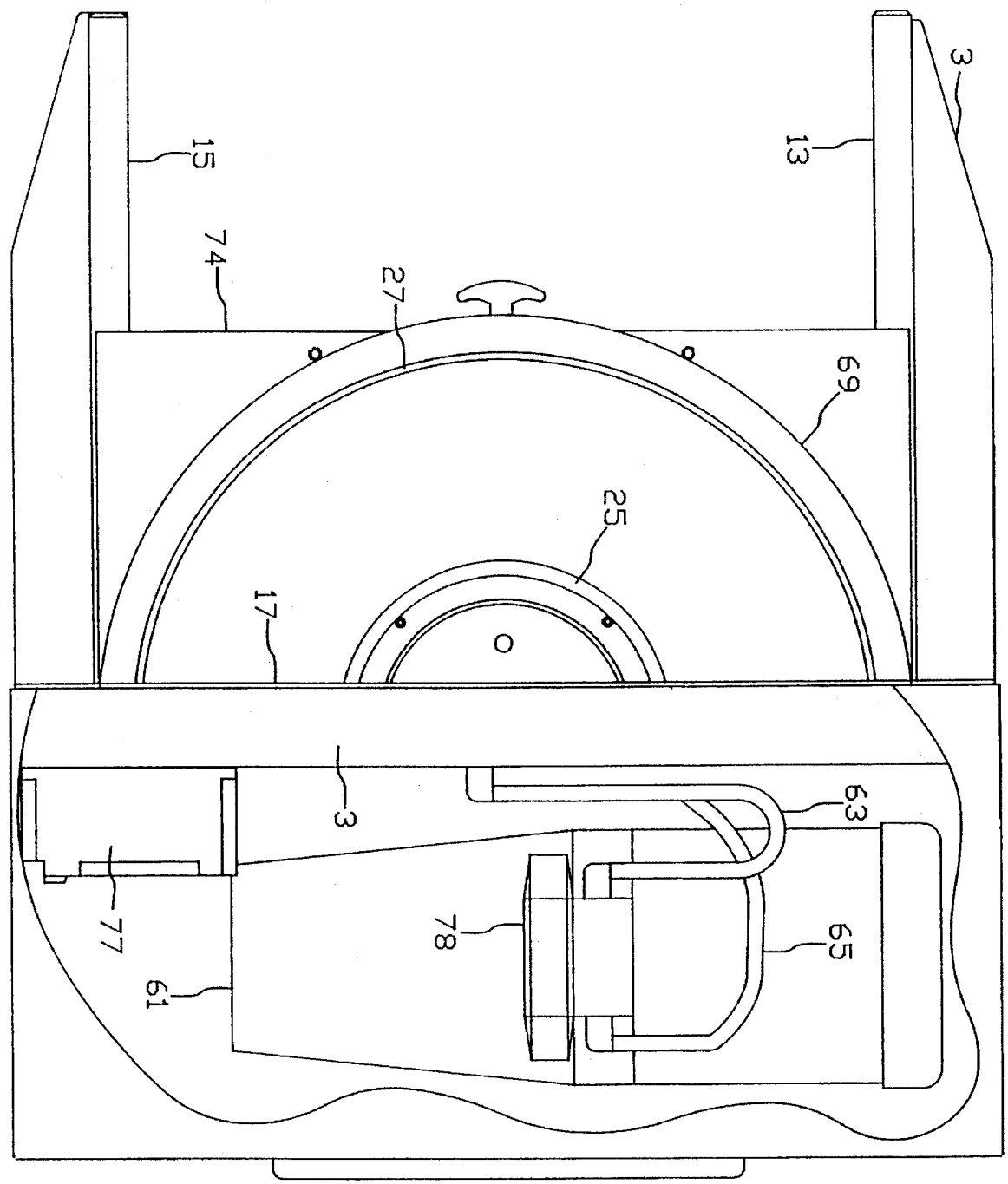
FIG. 2 shows a side top view of the device shown in FIG. 1.

Referring to both FIGS. 1 and 2, it can be seen that base tray 11 can be slid out beyond the front rectangular base 9 to receive selected pizza dough molds such as mold 69, and can be reinserted. In addition to drawer ways 13 and 15, sliding tracks, rollers, mounts, and stops as well as other such components may be oppositely and symmetrically located to facilitate sliding. Main housing frame 3 contains an upper encasement 17 on the frame for supporting push button/dwell cancel controls 19 and 21, heat control 70, dwell control 71, hydraulic piston cylinder 51 and hydraulic piston 23. Conventional mounts may be used to support cylinder 51. There is a pump and motor 61 and a hydraulic control valve 78, shown located therein. This enables the device to be used as a table model which can be placed in a small space, e.g. on a countertop. Hydraulic lines 63 and 65 allow for pump and motor 61 to move fluid, to thereby move piston 23 into the upward position, as shown, as a normal, rest position, and to move both piston 23 and top press mold 27 with its heated flanged cap 25 in a reciprocating fashion as is indicated by arrow 67.

There is also a small, optional computer controller 77 connected to the other components described herein, so as to actuate and stop the upward and downward motions by controlling hydraulic control valve 78 and to automatically regulate temperature by sensing and turning off and on the heating element located in flanged cap 25, in response to a setting established at heat control 70.

Controls 19 and 21 are located sufficiently apart so that two hands are generally required, the left hand used to press control 19 and the right hand used to press control 21, such that both controls must be depressed for piston 23 and top press mold 27 to reciprocate. The circuitry required for controls 19 and 21 is within the purview of someone skilled in the art. Reciprocation is automatic, and the process time for pressing a dough is about 10 seconds, although this depends on dough, thickness and temperature. Control 71 is for dwell adjustment and, given a specific heat setting, a user will be instructed to adjust the dwell to maximize speed while avoiding sticking by trying different settings. Top press mold 25 will be lowered to a bottom mold such as mold 69 which will contain pizza dough. The compression may be in the order of 1000 to 2000 psi.

Mold 69 is removable, interchangeable and reversible. This is a unique feature of the present invention, as quick-change will enhance speed and versatility and enable small shops to use a single machine. Note that mold 69 is not only removable, but reversible. On its top, as shown, is a mold cut 68 for a 10 inch pie, and on its bottom is a mold cut 66 for a 14 inch pie.

In one embodiment, the pressure from the compressor may be in the order of 1000 psi with pressure dissipated over the top press mold 27. Generally, top press mold 27 will be heated and the heating element will have an automatic off/on capability so as to maintain at least the undersurface of top press mold 27 heated to within a predetermined maximum temperature. This maximum temperature is a warming temperature and will be in a range of about 100° F. to 150° F. This is needed to relax the dough for forming the uncooked pie. Without heat, the dough will retract after being pressed, and the heat relaxes the dough to inhibit or prevent such retraction. On the other hand, higher temperatures used in cooked shell machines reduce flexibility and damage the dough structure, i.e. makes a hard crust, prior to application of sauce and condiments, and-subsequent oven baking.

The process time of 10 seconds (mentioned above) is merely exemplary and would include movement downwardly, resting for 5 or 7 seconds on the dough in its compressed state, and return to the upward, rest position. In preferred embodiments, the cycle times are adjustable. The heating of the underside of top press mold 27 uniquely enables the top press mold 27 to be returned to its upward position without the pizza dough sticking to the undersurface thereof, without the need for spraying with a release oil or polymer spray or other coating.

The return of top press mold 27 need not require the same pressure as the downstroke side of the cycle because more pressure is needed to compress the dough than would be needed to simply remove and return the top press mold 27 to its upward, rest position. Thus, as little as 200 to 500 psi will be adequate for the reverse or upward stroke. (The term "psi" is used herein is referring to pounds per square inch gauge.)

Figure 3:
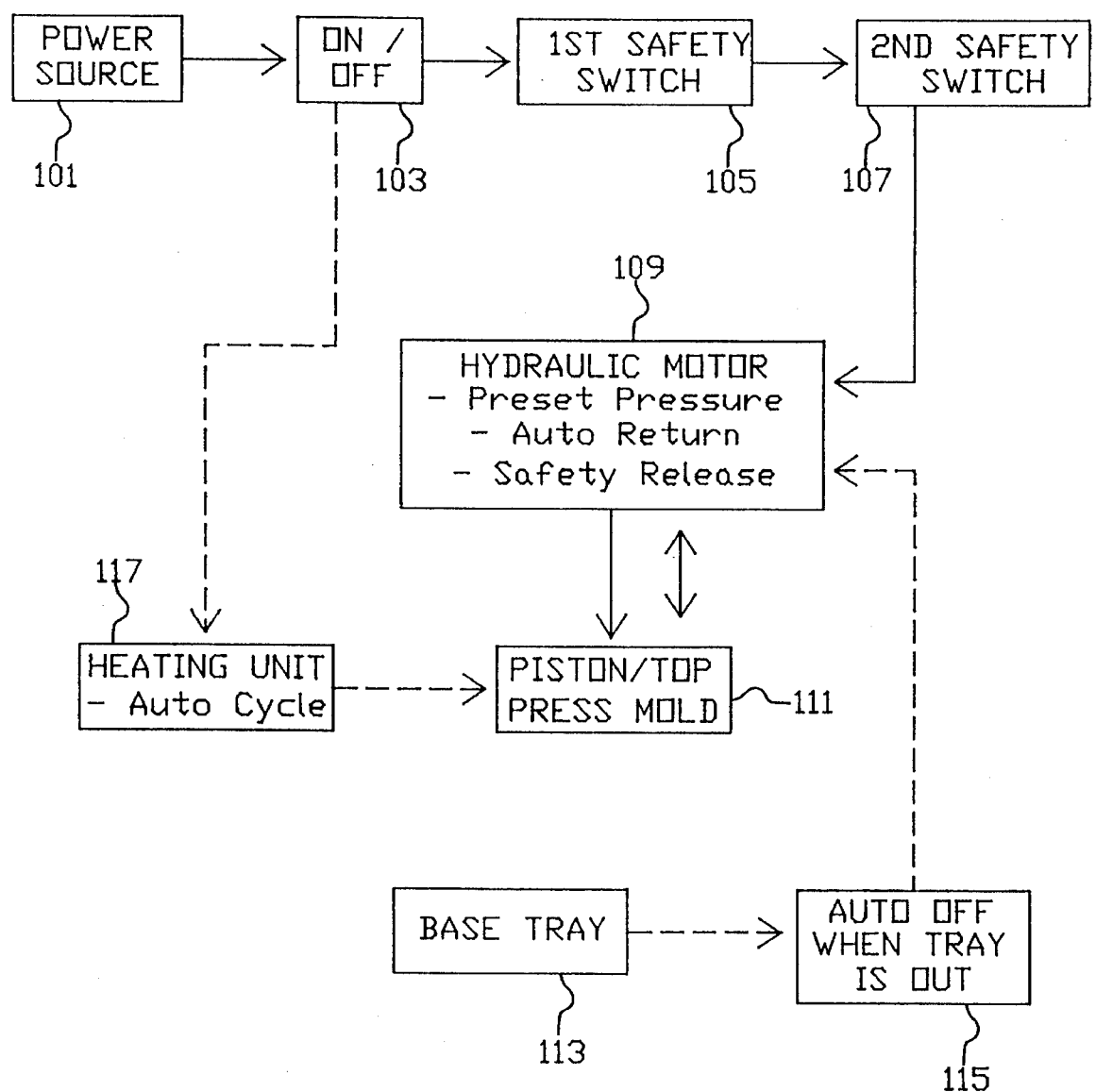
FIG. 3 shows a schematic diagram of a preferred embodiment present invention device.

FIG. 3 shows a schematic diagram of the salient features of one preferred embodiment device of the present invention. Power source 101, such as conventional a.c. power is switched on by switch 103. First safety switch 105 and second safety switch 107 must both be pressed for power to go to hydraulic motor 109. Motor 109 is designed to cycle through a reciprocal movement of piston-top press mold 111 so as to bias piston-top press mold 111 is an upward position, move it downward to a downward position against base tray 113 to press dough in a mold (not shown) on base tray 113, hold, and return. Motor 109 has a preset maximum pressure, an auto return feature and a safety release sensor which will sense when piston-top press mold 111 is stopped or an improper height (as in the case of a caught hand or other foreign element) and will reverse motor 109 so as to move piston-top press mold 111 back to its first position, i.e. its upward position, which is its rest position. The auto-return feature is within the purview of someone skilled in the art, and can be any known means for returning a press to its upward, or rest, position.

There is a heating unit 117 which is turned on when switch 103 is turned on, and this unit 117 may be one or more resistance heater elements and the unit 117 may have its own automatic on/off temperature sensor to maintain a predetermined maximum temperature within a range of 100° F. to 150° F., e g. a range of 110° F. to 135° F., and most preferably 115° F. to 125° F.

In preferred embodiments of the present invention, the safety releases, safety buttons, auto recycle, drawer opening sensor, adjustable dwell times and other operable features may be controlled by a microcomputer chip, e.g. a PLC-programmable logic controller.

Obviously, numerous modifications and variations of the present invention are possible in light of the above teachings. It is therefore understood that within the scope of the appended claims, the invention may be practiced otherwise than as specifically described herein.

The invention claimed is:

1. An automatic pizza dough press device for forming uncooked pizza pie from fresh dough, said device comprises:
   a. a main housing frame;
   b. a base tray slideably mounted within said frame such that said tray slides out of said frame for accessibility;
   c. an upper encasement on said frame;
   d. a motor;
   e. a pump coupled to said motor for creating hydraulic pressure;
   f. a hydraulic cylinder mounted to said encasement;
   g. a piston housed within said cylinder and hydraulically connected to said pump, said piston being capable of upward and downward movement, said piston being biased in an upward direction such that said piston returns to an upward position when at rest, said piston being in a downward position when compressing dough;
   h. a hydraulic control valve hydraulically connected to said pump for controlling said upward and downward movement of said piston;
   i. a top press mold connected to said piston, said top press mold having a pizza dough-forming underside plate and containing a heating unit, said heating unit being capable of heating a portion of said underside plate to a temperature of about 100° F. to about 150° F.; and
   j. controls for controlling the upward and downward movement of said piston, said controls comprising at least two separate, disparate controls connected to said motor, said two separate, disparate controls being operated substantially simultaneously to effect control over said motor, said two separate, disparate controls being located sufficiently apart such that a single hand cannot operate both controls simultaneously thereby necessitating two hands to operate both controls simultaneously.

2. The device of claim 1 wherein said pump creates a preset, maximum pressure.

3. The device of claim 1, further comprising:
   k. an auto-return feature for returning said piston from said downward position to said upward position after a preset period of time.

4. The device of claim 1, wherein said device further comprises;
   k. a safety release having a sensor and being electrically connected to said motor for automatically returning said piston to said upward position when said sensor senses that said piston stopped in said downward movement before reaching said downward position.

5. The device of claim 1, wherein said heating unit has a temperature sensor for switching said heating unit on and off to maintain said underside plate at a predetermined temperature.

6. The device of claim 1, wherein said device comprises:
   k. a computer controller electrically connected to said hydraulic control valve and said heating unit, said controller being configured to automatically return said piston from said downward position to said upward position after a preset period of time, said controller being configured to automatically maintain the temperature of said underside plate by turning off and on said heating unit.

7. The device of claim 1, wherein said base tray has dimensions adequate to receive dough molds of varying size and shape.

8. The device of claim 7, wherein said dough molds correspond to conventional pizzas selected from the group consisting of 10 inch, 14 inch, 16 inch, and 18 inch circular pizzas, and square Sicilian pizza.

9. The device of claim 1, wherein said device further comprises:
   k. a reversible dough mold base tray removably attached to said base tray, said dough mold having an obverse and a reverse side, said obverse side defining a predetermined size mold, said reverse side defining a different predetermined size mold.

10. An automatic pizza dough press device for forming uncooked pizza pie from fresh dough, said device comprises:
    a. a main housing frame;
    b. a base tray slideably mounted within said frame such that said tray slides out of said frame for accessibility;
    c. an upper encasement mounted on said frame;
    d. a motor;
    e. a pump coupled to said motor for creating hydraulic pressure, said pump creating a preset, maximum pressure;
    f. a hydraulic cylinder mounted to said encasement;
    g. a piston housed within said cylinder and hydraulically connected to said pump, said piston being capable of upward and downward movement, said piston being biased in an upward direction such that said position returns to an upward position when at rest, said piston being in a downward position when compressing dough;
    h. a hydraulic control valve hydraulically connected to said pump for controlling said upward and downward movement of said piston;
    i. a top press mold connected to said piston, said top press mold having a pizza dough-forming underside plate and containing a heating unit, said heating temperature of about 100° F. to about 150° F., said heating unit containing a temperature sensor for switching said heating unit on and off to maintain said underside plate at a predetermined temperature;
    j. controls for controlling the upward and downward movement of said piston, said controls comprising at least two separate, disparate controls connected to said motor, said two separate, disparate controls being operated substantially simultaneously to effect control over said motor, said two separate, disparate controls being located sufficiently apart such that a single hand cannot operate both controls simultaneously thereby necessitating two hands to operate both controls simultaneously;
    k. an auto-return feature for returning said piston from said downward position to said upward position after a preset period of time; and
    l. a safety release having a sensor and being electrically connected to said motor for automatically returning said piston to said upward position when said sensor senses that said piston stopped in said downward movement before reaching said downward position.

11. The device of claim 10, wherein said base tray has dimensions adequate to receive dough molds of varying size and shape.

12. The device of claim 11, wherein said dough molds correspond to conventional pizzas selected from the group consisting of 10 inch, 14 inch, 16 inch, and 18 inch circular pizzas, and square Sicilian pizza.

13. The device of claim 11 wherein said auto-return feature comprises a timer for setting said preset period of time.

14. The device of claim 13, wherein said top press mold is removably attached to said piston.

15. The device of claim 14, wherein said heating unit is capable of heating a portion of said underside plate to a temperature of about 110° F. to about 135° F.

16. The device of claim 10, wherein said device further comprises:
    m. a reversible dough mold base tray removably attached to said base tray, said dough mold having an obverse and a reverse side, said obverse side defining a predetermined size mold, said reverse side defining a different predetermined size mold.

17. The device of claim 16 wherein said auto-return feature comprises a timer for setting said preset period of time.

18. The device of claim 17, wherein said top press mold is removably attached to said piston.

19. The device of claim 18, wherein said heating unit is capable of heating a portion of said underside plate to a temperature of about 110° F. to about 135° F.

20. The device of claim 18, wherein said frame has dimensions small enough to allow for placement on a conventional table top.

\* \* \* \* \*